United States Patent [19]
Takegawa et al.

[11] Patent Number: 5,477,698
[45] Date of Patent: Dec. 26, 1995

[54] AIR CONDITIONER

[75] Inventors: Hirozo Takegawa; Hiroyuki Miyamoto, Hirakata; Tomoko Kitamura, Moriguchi; Yuji Inoue, Sakai; Hisashi Kodama, Ikoma, all of Japan

[73] Assignee: Matsushita Electric Industrial Co. Ltd., Osaka, Japan

[21] Appl. No.: 299,670

[22] Filed: Sep. 2, 1994

Related U.S. Application Data

[63] Continuation of Ser. No. 76,424, Jun. 14, 1993, abandoned.

[30] Foreign Application Priority Data

Jun. 16, 1992 [JP] Japan ................................. 4-156939
Jun. 16, 1992 [JP] Japan ................................. 4-156941
Jul. 13, 1992 [JP] Japan ................................. 4-184848

[51] Int. Cl.$^6$ ................................................. F25D 17/00
[52] U.S. Cl. ........................... 62/180; 62/211; 236/78 B
[58] Field of Search ........................... 62/180, 211, 213; 454/233, 229; 236/78 B

[56] References Cited

U.S. PATENT DOCUMENTS

| | | | |
|---|---|---|---|
| 4,891,953 | 1/1990 | Isono | 236/78 B |
| 4,918,932 | 4/1990 | Gustafson et al. | 62/209 X |
| 5,078,318 | 1/1992 | Kawai et al. | 62/180 X |

FOREIGN PATENT DOCUMENTS

| | | | |
|---|---|---|---|
| 0186724 | 10/1984 | Japan | 62/180 |
| 2086634 | 8/1989 | Japan | 454/229 |

*Primary Examiner*—William E. Wayner
*Attorney, Agent, or Firm*—Wenderoth, Lind & Ponack

[57] ABSTRACT

An air conditioner includes a comprising temperature regulator for regulating air temperature in a room, a circulating mechanism for circulating the temperature regulated air, a first room temperature detector for detecting room temperature in a set location in the room, a second room temperature detector for detecting room temperature in a location lower than the first room temperature detector, and a controllor for controlling the temperature regulator in accordance with outputs from the first and second room temperature detectors so as to efficiently equalize indoor temperatures and reduce energy consumption.

8 Claims, 7 Drawing Sheets

AIR CONDITIONER

This application is a continuation of now abandoned application, Ser. No. 08/076,424, filed Jun. 14, 1993.

BACKGROUND OF THE INVENTION

The present invention relates to an air conditioner for regulating the temperature of air indoors by directly heating and cooling indoor air for use at home or in the office.

PRIOR ART

According to the conventional room temperature control method for an air conditioner which effects heating and cooling by directly heating and cooling air indoors, that is, so-called a convection system, the temperature of air taken in is determined and the temperature controlled so that it approaches a set value. In addition, as most air conditioners are mounted as indoor appliances near the ceiling, because they are of the wall-mounted type, room temperature control is effected by sensing only air temperature near the ceiling.

However, with this method, the difference between upper and lower temperatures indoors can be a considerable cause of discomfort. This problem has been ameliorated considerably in convection cooling by such means as changing the direction of the wind. However, the wind itself can become an element of discomfort when heating, and there are limits to how far the difference between upper and lower temperatures can be reduced using a single air conditioner. Attempts have been made to equalize temperature distribution indoors by an air conditioner using in conjunction with such means as a ceiling fan, and through reverse rotation of the vanes. The vanes are rotated in the reverse direction so as to agitate air more efficiently by forcibly sending the cool lower layer of air up to the ceiling, and forcing down warm air that has accumulated in the top layer.

However, with the conventional control method for the type of air conditioner that does not use a ceiling fan as described above, temperature stratification is caused by differences in air density, resulting in a greater upper/lower temperature difference in the room, as high-density low-temperature air stays at the bottom and low-density high-temperature air stays at the top.

Actual results of heating with a conventional air conditioner in which a difference between air temperatures at 10 cm above floor level and 230 cm above floor level is measured is shown in FIG. 7. FIG. 7 shows an experimental result of the temperature difference between the upper and lower elevations in the case where the setting temperature was 24° C., the room was 25 m² square, by a conventional air conditioner of a well-hanging heat pump type having a capacity of 10 KW was used, and the outside temperature was 10° C. The temperature difference increased with time, and there was an upper/lower temperature difference of 8.6° C. after one hour. Air temperature near the feet was low, notwithstanding the fact that the set temperature had been reached, thus causing considerable discomfort. Moreover, discomfort was still caused when the set temperature was raised so as to increase air temperature near the feet, as room temperature around the head increased above the set temperature.

In addition, when only the temperature of room is detected air close to the ceiling of the room which is always higher than the temperature of an area close to the floor of the room, the person in the room often feel cool even if the setting temperature is established during heating. For eliminating such a cool feeling, the person in the room tries to set the room temperature high, for instance, several degrees more than the real setting room temperature, but it is difficult for the person to appropriately adjust the room temperature which depends on the dimension of the room and the capacity of the installed air conditioner. Accordingly, it is necessary for person to determine the room temperature which appropriately represents the residing area of the room.

Furthermore, in the above example of a conventional air conditioner which uses a ceiling fan aimed for eliminating effectively the difference of temperatures at the upper and lower positions of the room, the ceiling fan is switched on manually, and so the upper/lower temperature difference makes conditions indoors uncomfortable if the user forgets to switch on the ceiling fan when heating. The set temperature must therefore be increased because it is cold around the feet, thus resulting in operating conditions which hinder energy conservation. In addition, if the ceiling fan is switched on when heating but not switched off when heating is stopped, then energy is of course used inefficiently. In the case of continuous operation, the ceiling fan is used more than is necessary so as to reduce the upper/lower temperature difference, and is thus used inefficiently. It is thus not possible to efficiently equalize temperature distribution indoors, and there is the problem of inefficient energy consumption.

SUMMARY OF THE INVENTION

The object of the present invention is therefore to provide a ventilating device which solves the problems of conventional devices described above, efficiently equalizing temperatures indoors, regardless of the presence or otherwise of a ceiling fan, and reducing energy consumption.

To this end, the ventilating device of the invention comprises a compressor; a heat exchanger for the outside and inside of a room; temperature regulating means for regulating air temperature in a room; circulating means for circulating the temperature regulated air including a fan for blowing air; a first room temperature detecting means for detecting room temperature in a set location in the room of a height more than 100 cm above the room floor; a second room temperature detecting means for detecting room temperature in a set location lower than the first room temperature detecting means at height lower than 100 cm above the room floor; and controlling means including a micro-computer for controlling the temperature regulating means in accordance with outputs from the first and second room temperature detecting means, that is, at the state in which the difference of outputs from the first and second room temperature detecting means is larger than a given value.

Preferably, the ventilating device may also comprise comparing means for comparing temperatures detected by means of the first and second room temperature detecting means, the capacity of the temperature regulating means being changed or stopped while leaving the circulating means running as it is in accordance with the comparison results of the comparing means, that is, at the state in which the difference of the room temperatures is larger than a given value.

Preferably the ventilating device may further comprise a second circulating means provided separately from the circulating means; and controlling means for controlling the second circulating means in accordance with outputs from the room temperature detecting means, that is, the room temperature which is calculated by the two room temperatures detected by the first and second room temperature detecting means.

Preferably, the ventilating device may further comprise the second circulating means disposed on or near the ceiling in the room.

Temperature stratification is caused by the different densities of the air itself if air in a room is heated or cooled directly. This is because the density of warm air falls, and so it stays near the ceiling, while the density of cold air increases, and so it stays near the floor. If the upper/lower temperature difference and room temperature exceed set values, the compressor is stopped and circulation of coolant towards the heat exchanger in the room is halted so that air in the room is caused to circulate through operation of the fan alone. The result is to reduce the upper/lower temperature difference of air in the room, thus solving the problem of coldness around the feet and uncomfortable warmth around the head. In addition, if room temperature falls below a set temperature, then pleasant warmth can always be provided by starting up the compressor again and restarting heating.

Namely, when the difference of room temperatures to be detected at positions of higher than 100 cm and lower the 100 cm over the room floor is larger than a given value, the micro computer controls the temperature adjusting means including compressor, heat exchanger and the likes.

Further, the first room temperature detecting means detects room temperature in a high set location in the room higher than 100 cm over the room floor; the second room temperature detecting means detects room temperature in a location lower than the high set location lower than 100 cm over the room floor; the comparing means compares room temperatures detected by means of the first room temperature detecting means and second room temperature detecting means; and the controlling means controls the temperature regulating means and circulating means so as to change or stop the capacity of the temperature regulating means in accordance with the comparison results of the two temperatures, maintaining the operation of the circulating means as it is. The difference between temperatures in the upper and lower portions of the room is thus reduced, making it possible to effect more comfortable heating.

Namely, when the difference of room temperatures to be detected at positions of higher than 100 cm and lower than 100 cm over the room floor is larger than a given value, the temperature adjusting means including compressor, heat exchanger and the like is changed or stopped while operating the air circulating means including a fan.

Further, the first room temperature detecting means detects room temperature in the upper portion of the room; the second room temperature detecting means detects room temperature in the lower portion of the room; and the second circulating means, such as a fan, is controlled in accordance with the comparison results, thus equalizing temperatures indoors more rapidly and appropriately.

Namely, the room temperature can be obtained at the residing area of the room correctly by means of calculating the room temperatures obtained by the first and second room temperature detecting means.

In addition, the air blowing means such as a ceiling fan provided on the ceiling or at the position close to the ceiling of room can be controlled.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

EMBODIMENTS

Figure 1:
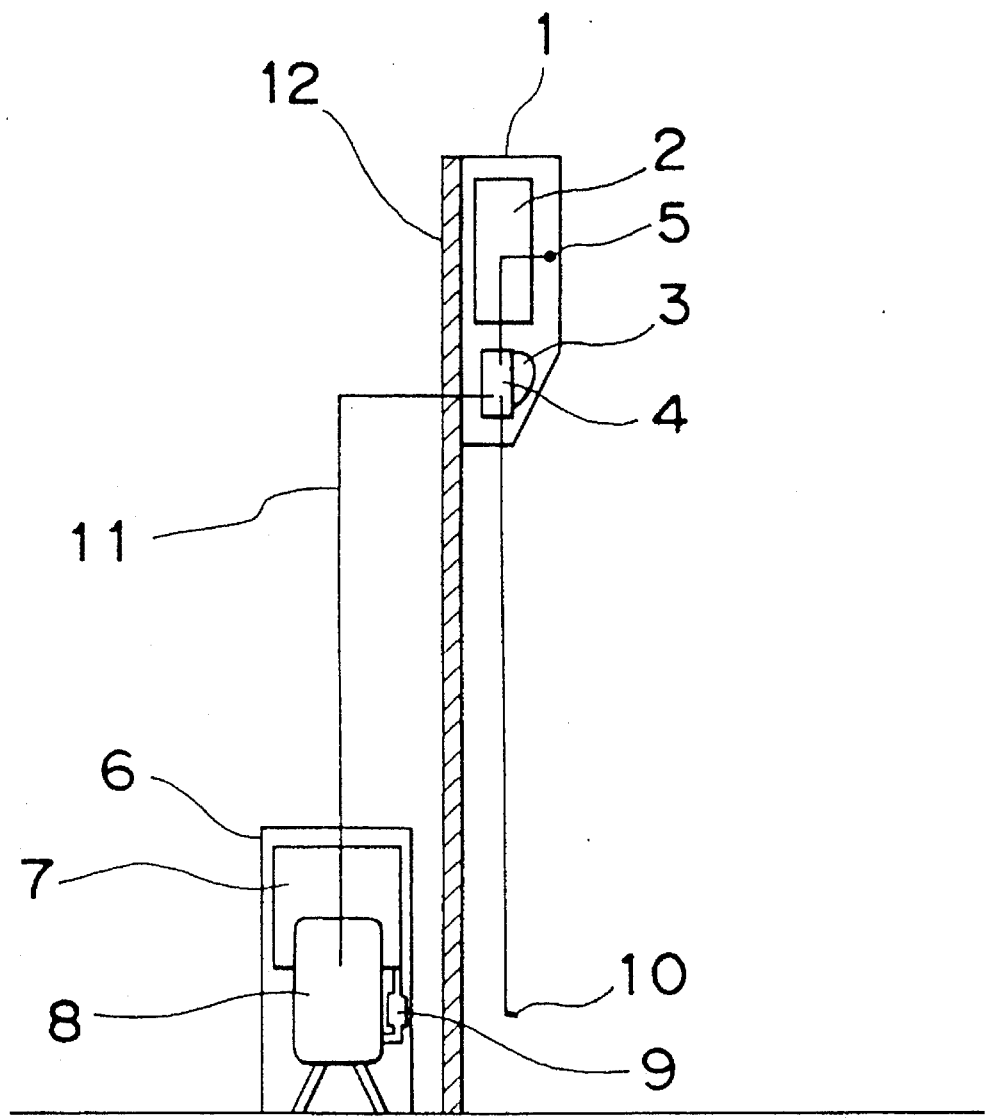
FIG. 1 is a structural diagram of an air conditioner in a first embodiment of the present invention.

FIG. 1 is a structural diagram of a heat-pump-type heating/cooling device which is installed in a room of a private house having a ceiling height of 240 cm, showing a first embodiment of the present invention. As FIG. 1 shows, an indoor device 1 is provided with, amongst others, an indoor heat exchanger 2 which is a kind of temperature adjusting means, a fan 3 which is a kind of blowing means, control mechanism 4 including a micro-computer, and a thermistor 5 (disposed 230 cm above floor level), which serves as the first room temperature detecting means, and an outdoor device 6 is provided with, amongst others, an outdoor heat exchanger 7, a compressor 8 and an expansion valve 9. Reference numeral 10 indicates a thermistor which acts as the second room temperature detecting means (disposed 10 cm above floor level). The control mechanism 4 receives outputs from the thermistors 5 and 10, and controls starting and stopping of the compressor 8 by means of a control line 11. Reference numeral 12 indicates an outer wall. The thermistor 5 is provided inside the room in front of the heat exchanger 2 for detecting the upper room temperature at the position close to the room ceiling such as a temperature of the suction air.

Figure 2:
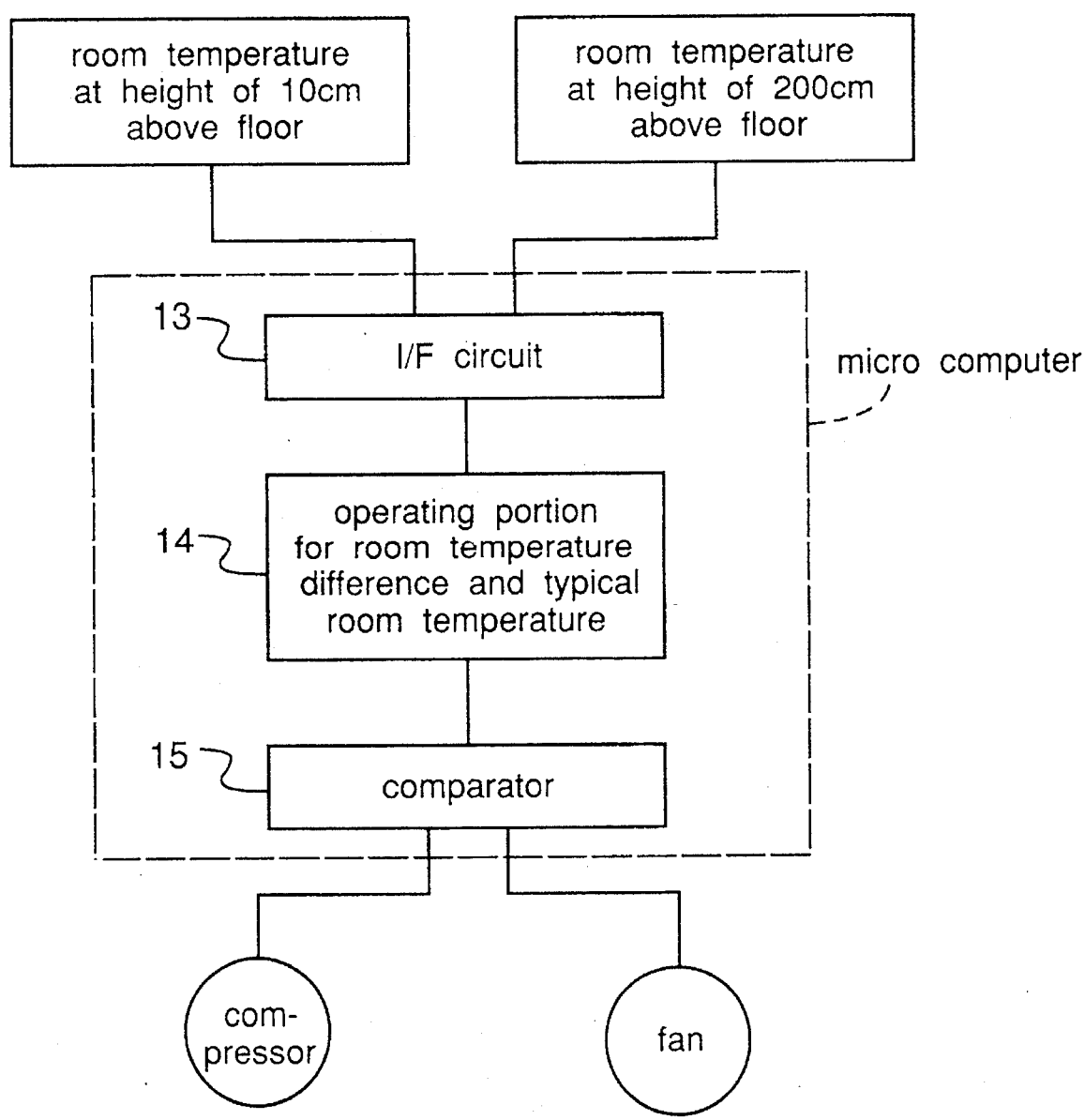
FIG. 2 is an electric circuit digraph for controlling the air conditioner of FIG. 1.

FIG. 2 shows a diagram of a control circuit for the first embodiment, where the control mechanism 4 comprises an I/F circuit 13 for conducting an A/D conversion upon receiving the outputs from the thermistors 5 and 10, a room temperature difference operator 14 for calculating the representing room temperature and the difference between the outputs of the thermistors 5 and 10, a comparator 15 for controlling the rotational number of the fan 3 and the start and stop of the compressor 8 in accordance with the resultant to be obtained in the comparison between a value of predetermined temperature difference, for instance, 3° C. and the output from the room temperature difference operator 14.

Figure 3:
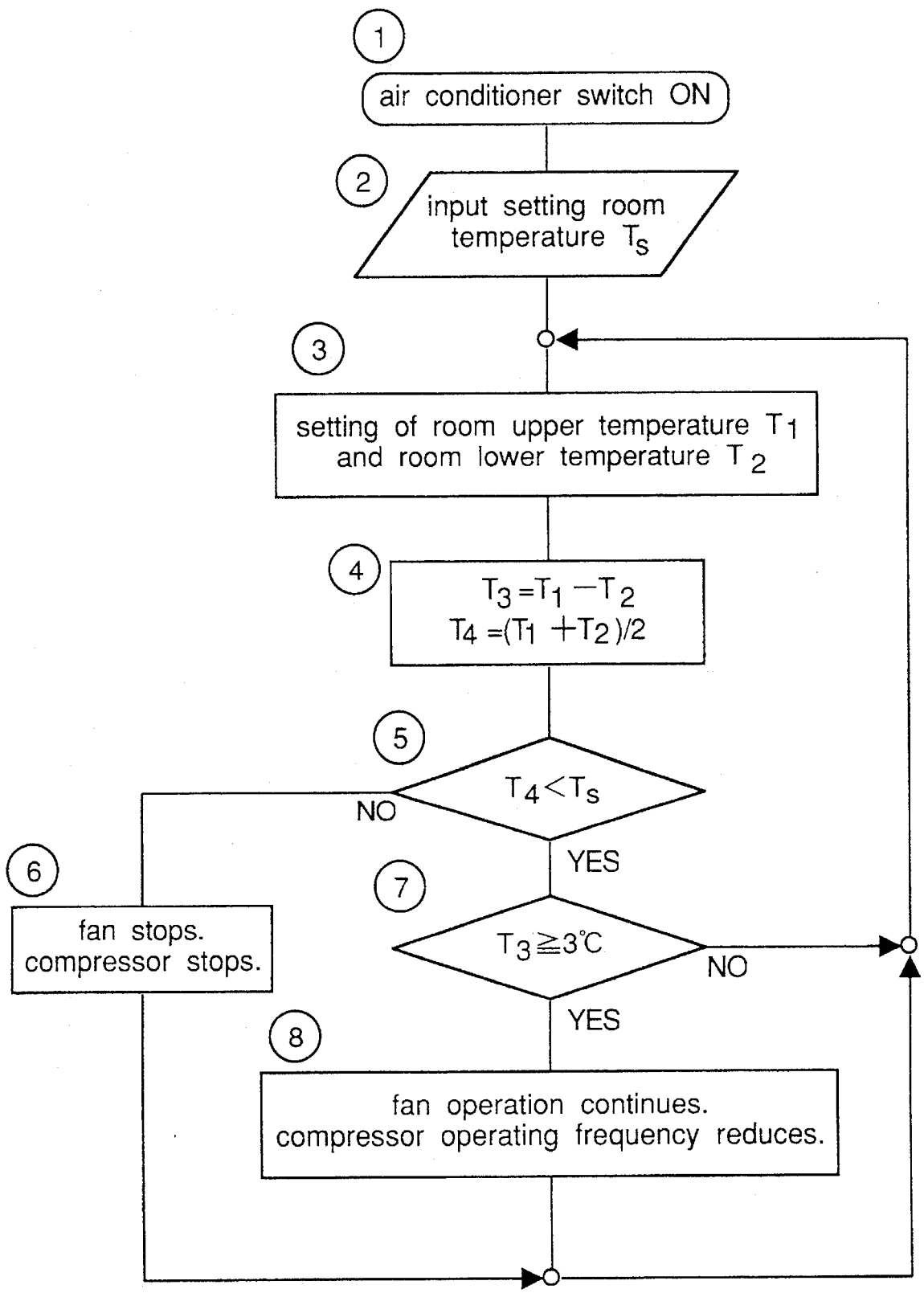
FIG. 3 is a control flow-chart for the first embodiment of the present invention.

The following is an explanation of the operation of the first embodiment. FIG. 3 is an operational flow chart showing a control process for the heating operation of the heat pump type heating apparatus of the present invention. In FIG. 3, if the switch of the air conditioner is switched ON (step 1), the setting temperature Ts, for instance, 24° C. is inputted (step 2), and the room upper temperature T1 and the room lower temperature T2 are detected, for instance, at every one minute by the thermistors 5, 10 (step 3). Where T3 is a difference of the temperatures T1 and T2, and T4 is an arithmetic mean of the temperatures T1 and T2 (step 4), T4 is compared with Ts (step 5), and, if T4 is not less than Ts, both the fan and compressor are stopped (step 6). If T4 is smaller than Ts, T3 is compared with a predetermined temperature, for instance, 3° C. in this embodiment (step 7). If T3 is larger than the predetermined temperature, the operation of fan is continued upon reducing the operational frequency of the compressor (step 8). If T3 is less than the predetermined temperature, the operation returns back to the step 3.

Figure 4:
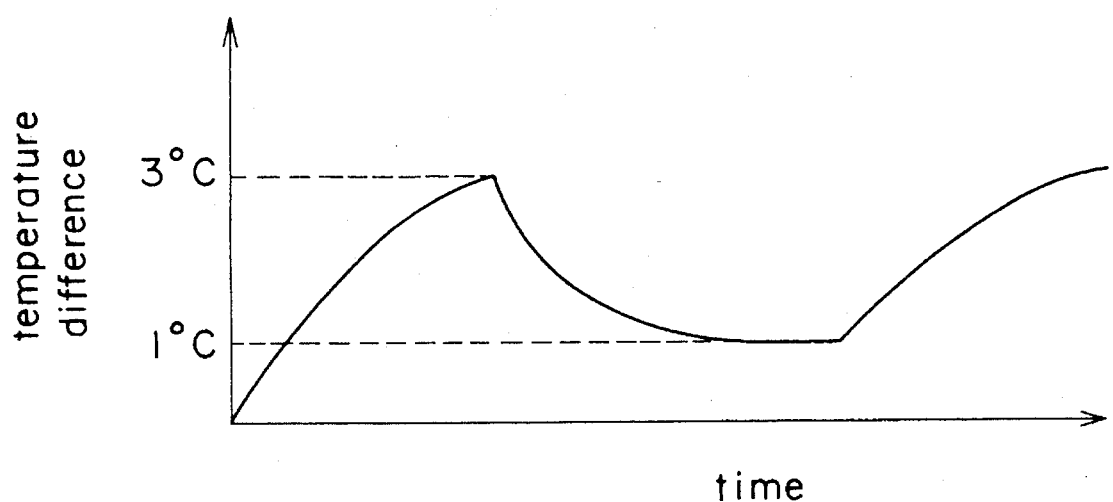
FIG. 4 is a temperature-change graph showing indoor upper/lower temperature difference for the first embodiment of the present invention.

FIG. 4 shows a graph of measured results of a time in time variation of the temperature difference between the thermistors 5 and 10, that is, the air temperature at 230 cm. above the room floor and the air temperature at 10 cm. above the room floor, in the heating operation of the first embodiment. There is no upper and lower temperature difference immediately after starting the heating operation, but the upper and lower temperature difference becomes gradually large with the passing time. Then, if the lower and upper temperature difference becomes larger than the predetermined value, the control mechanism 4 reduces the operational frequency of compressor 8 to make the heating capacity small. Thereafter, the fan 3 of the inner room machine 1 is operated to circulate the room air, and the lower and upper temperature difference becomes 1° C. with a T4 setting temperature of 24° C. to operate the compressor with a capacity in response to heat loading and to continue the heating operation until the upper and lower temperature difference becomes larger than the predetermined value, for instance, 3° C. With the result of heating operation under the condition having the upper and lower temperature difference being within the predetermined value, only two persons out of ten experience an uncomfortable feeling, which is greatly improved compared to the conventional apparatus in which nine persons out of ten feel uncomfortable. In the embodiment, T3 is compared with the predetermined value such as 3° C., but this value is not be limited, and the values of positions for the thermistors 5 and 10 are not limited to 230 cm. and 10 cm. above the room floor, and are preferred to be at upper and lower sides of a boundary of 100 cm. above the room floor. Also, T4 is an arithmetic mean of between T1 and T2, but may be set by a equation of $T4 = 0.7 * T1 + 0.3\ T2$ with so as to provide a different weight thereon.

Figure 5:
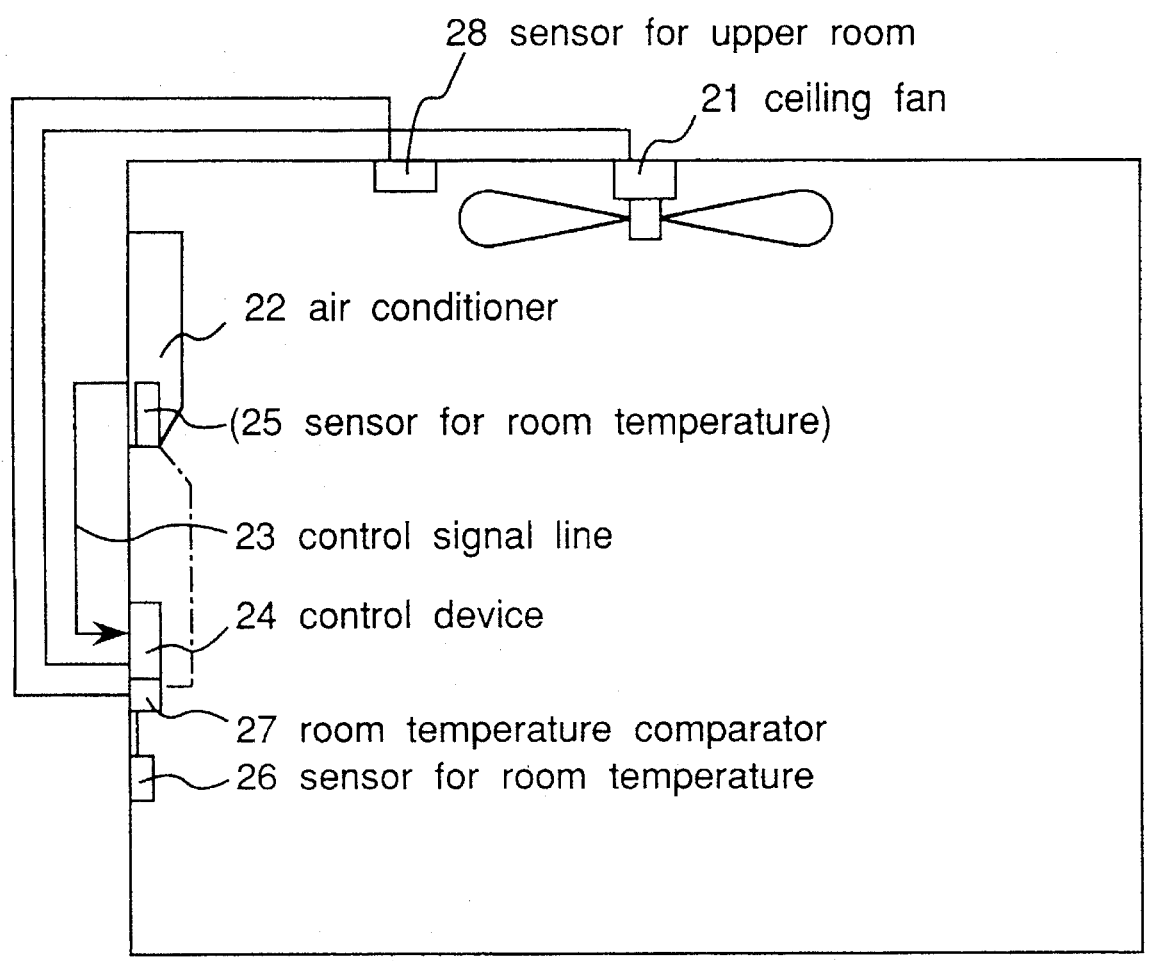
FIG. 5 is a structural diagram of an air conditioner in a second embodiment of the present invention.
Figure 6:
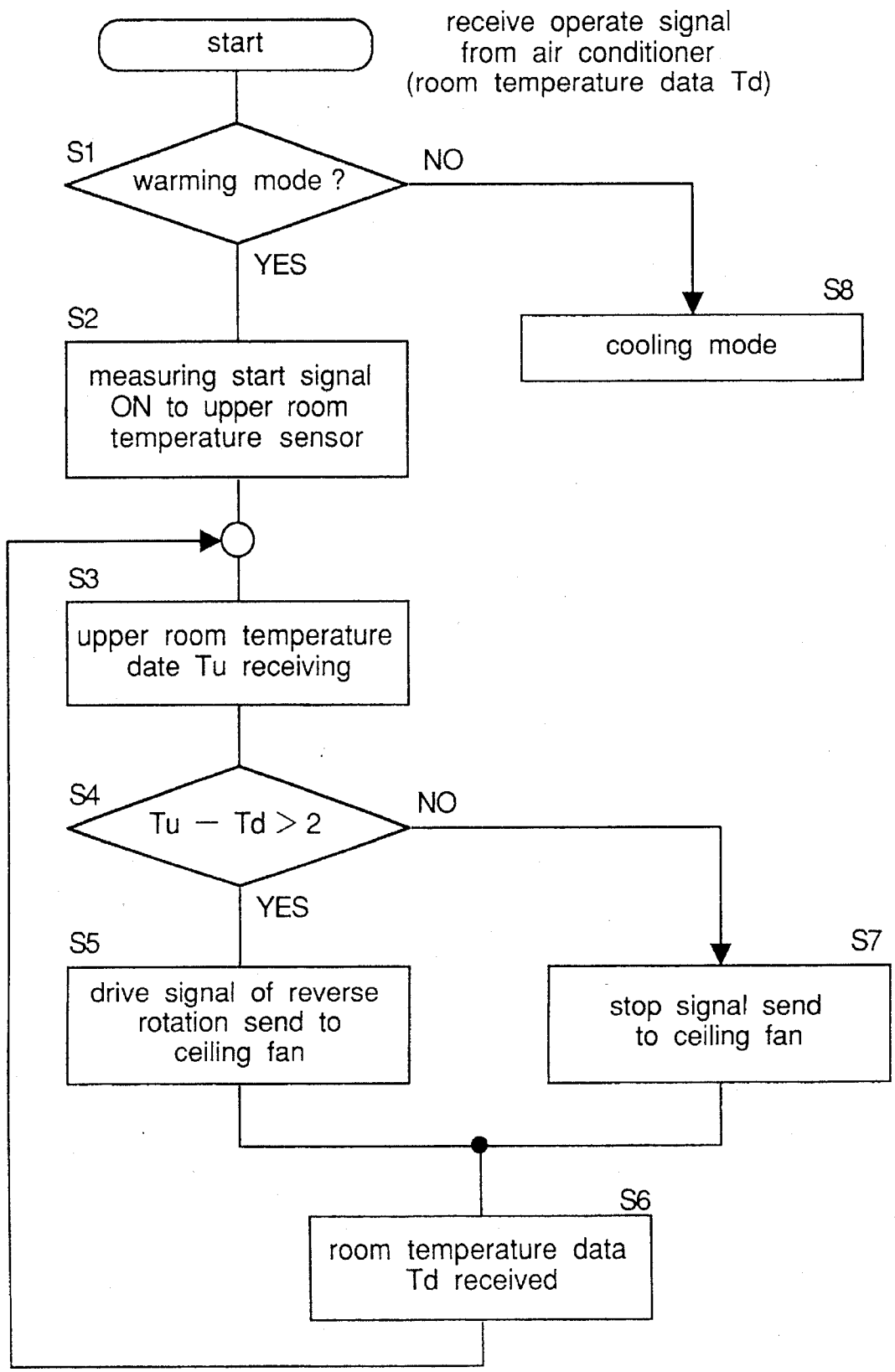
FIG. 6 is a control flow-chart according to the second embodiment.
Figure 7:
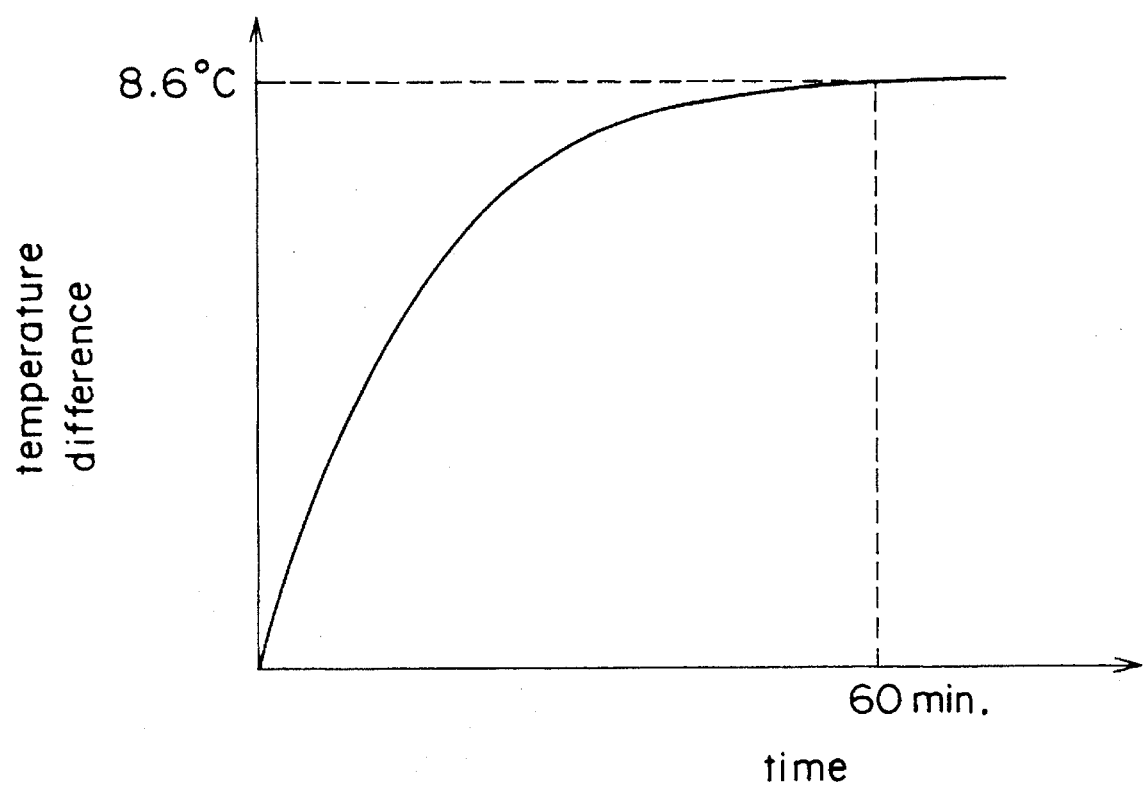
FIG. 7 is a temperature-change graph showing indoor upper/lower temperature difference for a conventional example.

Next, as a second embodiment of the present invention, an operation for an air conditioner employing a ceiling fan as a second blower is described with reference to FIG. 5 showing a construction of an air conditioner and FIG. 6 showing a flow chart for controlling the air conditioner.

Firstly, a heating operation signal is sent along a control signal line 23 to a control device 24 when the air conditioner 22 is set to heating and switched on. At the same time, room temperature data (Td) detected by means of the room temperature detecting means 25 (the example shown here uses room temperature detecting means 25 provided within the air conditioner 22, without using room temperature detecting means 26 provided separately) are inputted to the room temperature comparing means 27.

Next, the control device 24 determines a heating mode or cooling mode (step S1), and, if the result is a heating mode, sends a measuring start signal to the upper room temperature detecting means 28 (step S2), after which the room temperature comparing means 27 receives upper room temperature data (Tu) (step S3). The room temperature comparing means 27 compares the two room temperatures received (step S4), and outputs the result to the control device 24. If the comparison result (Tu-Td) is, for example, less than 2, the control device 24 transmits a stop signal to the ceiling fan 21 (step S7), although the ceiling fan 21 is in an off state.

In this way, measuring and reception of room temperature data (Td) and upper room temperature data (Tu) is repeated until the comparison result (Tu-Td) exceeds 2. When the comparison result (Tu-Td) exceeds 2, the control device 24 transmits an operation signal for reverse rotation to the ceiling fan 21 (step 5). The ceiling fan 21 starts running, and, after operating for a fixed time, measurement and reception of room temperature data (Td) and upper room temperature data (Tu) is started. The control device 24 leaves the ceiling fan 21 running until the comparison result (Tu-Td) falls below 2, and transmits a stop signal to the ceiling fan 21 when the comparison result (Tu-Td) falls below 2 (step S7), thus causing the ceiling fan 21 to stop.

In addition, the control device 24 afterwards receives a stop signal for the air conditioner 22 via the control signal line 23 when heating with the air conditioner is stopped. At this time, the process described above is terminated if the comparison result (Tu-Td) is less than 2, and, if the comparison result (Tu-Td) exceeds 2, a stop signal is transmitted to the ceiling fan 21 when the comparison result (Tu-Td) falls below 2, so as to terminate the process described above.

When the air conditioner 22 is run for cooling and a cooling operation signal is inputted via the control signal line 23 by the control device 24, the cooling mode process (step 8) is effected, and the control device 24 transmits a standard rotation operation signal to the ceiling fan 21. The ceiling fan 21 is caused to rotate in the standard direction when cooling because the upper/lower temperature difference is generally small when cooling, and the wind feels pleasant.

By controlling the operation of the ceiling fan 21 in accordance with the upper/lower temperature difference detected in the room, it is possible to effect an efficient automatic operation without causing uneven upper/lower temperature distribution in the room, thus promoting energy conservation.

Moreover, by constructing so as to receive operation signals when cooling or heating using the air conditioner 22, the ceiling fan can be efficiently operated automatically, thus eliminating discomfort due to an upper/lower temperature difference caused after forgetting to switch on, and the wasteful use of energy caused by forgetting to switch off. It is thus possible to produce comfortable temperature conditions indoors by just switching the air conditioner on or off.

It should be noted that although in the embodiment described above the upper room temperature detecting means 28, which serves as the first room temperature detecting means, is located near the ceiling, it is not thus limited, and may be disposed in other locations in the upper portion of the room if by so doing it is possible to detect room temperature where the room temperature is higher. In addition, the location for disposal of room temperature detecting means 25 or 26, which serve as second room temperature detecting means, is not limited if below the first room temperature detecting means. Essentially, the room temperature detecting means need only to be disposed so that the upper/lower temperature difference in the room may be detected.

In addition, in the embodiments described above, the control mechanism 24, which serves as the controlling means, is constructed so as to start/stop the ceiling fan 21 only when heating, in accordance with the temperature comparison results, but is not thus limited, and may be constructed so as to similarly start/stop ceiling the ceiling fan 21 when cooling. If thus constructed, the ceiling fan 21 may be left to rotate in the standard direction.

Further, in the embodiments described above, control of the ceiling fan 21, which serves as the circulating means, is effected by starting/stopping in accordance with room temperature comparison results, but is not thus limited, and may be constructed so as to change the frequency of rotation continuously or in steps so as to change the circulating capacity.

Further, in the second embodiment described above, the circulating means is provided on the ceiling, but is not thus limited, and may of course be disposed in other locations if by so doing temperature distribution in the room can be equalized.

Further, in the second embodiment described above, an operation signal is inputted directly from the air conditioner 22 to the operating state detecting means of the air conditioner 22 using a control signal line 23, but is not thus limited, and, if it can detect the on state of the air conditioner 22, may be constructed so as to detect whether, for example, the change in room temperature is upward or downward, and to detect the cooling or heating operating state.

According to the present invention described hereinabove, it is possible to reduce the difference between upper and lower air temperatures by circulating air within the room, and maintaining them within set values when room temperature when heating is equal to or greater than a set value and the upper/lower temperature difference is equal to or greater than a set value with an air conditioner which effects heating and cooling by directly heating or cooling air in the room. In addition, the compressor is started up again and heating restarted when the room temperature falls below a set value. As a result, it is possible to effect comfortable heating at all times, something of great practical value.

Moreover, it is possible to reduce an upper/lower temperature difference in the room, reducing feelings of discomfort, as the capacity of the temperature regulating means can be changed or stopped with the circulating means left running as it is, in accordance with the comparison results of the two room temperatures.

In addition, it is possible to rapidly shift to a more comfortable state, thus reducing energy consumption, as a second circulating means is provided and caused to operate in accordance with the comparison results.

Furthermore, as the blowing means is automatically operated to start or stop in response to the comparison result of detected two room temperatures, equal room temperature in the whole area can be effectively achieved upon eliminating loss consumption of energy for heating and cooling.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An air heating apparatus comprising:

an air temperature regulating means, including a heat exchanger and a compressor, for effecting air temperature regulation in a room;

circulating means for circulating air which has been regulated in temperature by said air temperature regulating means;

a first room temperature detecting means for detecting a first room temperature at a first set location in said room;

a second room temperature detecting means for detecting a second room temperature at a second location which is lower than said first set location of said first room temperature detecting means; and controlling means for controlling said temperature regulating means and said circulating means in accordance with respective outputs from said first and second room temperature detecting means, wherein said controlling means stops the circulation of air by said circulating means and stops an operation of said compressor when an average of said first and second room temperatures is not less than a preset room temperature setting, and wherein said controlling means reduces an operating frequency of said compressor while leaving said circulating means running as is when both said average is less than said preset room temperature setting and a difference between said first and second room temperatures is equal to or larger than a preset value.

2. An air heating apparatus as defined in claim 1, wherein said controlling means is further for controlling a second circulating means which is different from said circulating means.

3. An air heating apparatus as defined in claim 2, further comprising said second circulating means disposed on or near a ceiling in said room.

4. An air heating apparatus as defined in claim 1, further comprising a second circulating means disposed on or near a ceiling in said room.

5. An air conditioner comprising:

an air temperature adjusting means for adjusting air temperature in a room and including operatively coupled outdoor and indoor devices, said outdoor device having a compressor, an expansion valve and an outside heat exchanger, and said indoor device having an inside heat exchanger;

an air blower including a fan for blowing air which has been temperature adjusted by the air temperature adjusting means into the room;

a first room temperature detecting means including a temperature sensor for detecting the room temperature at a height inside the room which is higher than 100 cm. above a floor of the room;

a second room temperature detecting means including a temperature sensor for detecting the room temperature at a height inside the room which is lower than 100 cm. above the floor of the room;

a control means including a computer for controlling the air temperature adjusting means and the air blower in accordance with respective outputs of the first room temperature detecting means and second room temperature detecting means, wherein said control means stops the circulation of air by said air blower and stops an operation of said compressor when an average of said first and second room temperatures is not less than a preset room temperature setting, and wherein said controlling means reduces an operating frequency of said compressor while leaving said air blower running as is when both said average is less than said preset room temperature setting and a difference between said first and second room temperatures is equal to or larger than a preset value.

6. An air heating apparatus as defined in claim 5, wherein the two room temperatures detected by the first room temperature detecting means and second room temperature detecting means are used by said control means to calculate an overall room temperature in the room.

7. An air heating apparatus as defined in claim 5, wherein the control means is adapted to control a second air blower provided separately from the air blower.

8. An air heating apparatus as defined in claim 7, wherein the second air blower is positioned on or adjacent to a ceiling of the room.

* * * * *